United States Patent
Okada et al.

(10) Patent No.: US 7,403,472 B2
(45) Date of Patent: *Jul. 22, 2008

(54) OFDM RECEIVING DEVICE AND OFDM RECEIVING METHOD

(75) Inventors: Takahiro Okada, Saitama (JP);
Yoshikazu Miyato, Chiba (JP);
Yasunari Ikeda, Kanagawa (JP);
Tamotsu Ikeda, Tokyo (JP)

(73) Assignee: Sony Corporation, Tokyo (JP)

( * ) Notice: Subject to any disclaimer, the term of this patent is extended or adjusted under 35 U.S.C. 154(b) by 582 days.

This patent is subject to a terminal disclaimer.

(21) Appl. No.: 11/089,810

(22) Filed: Mar. 25, 2005

(65) Prior Publication Data

US 2005/0169166 A1    Aug. 4, 2005

Related U.S. Application Data

(63) Continuation of application No. 09/834,282, filed on Apr. 12, 2001, now Pat. No. 7,075,949.

(30) Foreign Application Priority Data

Apr. 13, 2000    (JP)    ............................. 2000-117227

(51) Int. Cl.
*H04J 11/00*    (2006.01)
(52) U.S. Cl. ........................ 370/210; 370/208; 370/480

(58) Field of Classification Search .................. None
See application file for complete search history.

(56) References Cited

U.S. PATENT DOCUMENTS

| 5,694,389 | A |   | 12/1997 | Seki et al. |   |
|---|---|---|---|---|---|
| 5,761,190 | A |   | 6/1998 | Yamauchi et al. |   |
| 5,818,813 | A |   | 10/1998 | Saito et al. |   |
| 6,151,369 | A | * | 11/2000 | Ohkubo et al. | 375/332 |
| 6,314,083 | B1 |   | 11/2001 | Kishimoto et al. |   |
| 6,603,734 | B1 | * | 8/2003 | Oksanen | 370/203 |

* cited by examiner

*Primary Examiner*—Duc C Ho
(74) *Attorney, Agent, or Firm*—Frommer Lawrence & Haug LLP; William S. Frommer

(57) ABSTRACT

The time required for switch the channel can be remarkably curtailed. When broadcasting signals through a plurality of information channels with an OFDM system, the plurality of information channels are multiplexed in the sense of frequency and collectively subjected to IFFT modulation for connected transmission instead of subjecting the plurality of information channels independently to OFDM modulation for transmission. With this arrangement, the efficiency of exploitation of frequencies is improved. According to the invention, the OFDM frames are synchronized for each information channel for the purpose of connected transmission. Then, the OFDM receiver can switch the information channel for signal reception, maintaining the frame synchronizing signals.

1 Claim, 21 Drawing Sheets

| SEGMENT NO. | |
|---|---|
| CP | 0 |
| AC1_1 | 35 |
| AC1_2 | 79 |
| AC2_1 | 3 |
| AC2_2 | 72 |
| AC2_3 | 85 |
| AC2_4 | 89 |
| TMCC 1 | 49 |
| TMCC 2 | 61 |
| TMCC 3 | 96 |
| TMCC 4 | 99 |
| TMCC 5 | 104 |

FIG.8

(PRIOR ART)

CARRIER ARRANGEMENT OF TMCC AND AC OF SYNCHRONOUS MODULATOR

| SEGMENT NO. | |
|---|---|
| AC1_1 | 35 |
| AC1_2 | 79 |
| TMCC 1 | 49 |

FIG.9

(PRIOR ART)

| | |
|---|---|
| $B_0$ | REFERENCE FOR DIFFERENTIAL DEMODULATION |
| $B_0 \sim B_{16}$ | SYNCHRONIZING SIGNAL<br>(W0=0011010111101110, W1=1100101000010001) |
| $B_{17} \sim B_{19}$ | IDENTIFICATION OF SEGMENT FORMAT<br>(DIFFERENTIAL 111, SYNCHRONOUS 000) |
| $B_{20} \sim B_{121}$ | TMCC INFORMATION (102 BITS) |
| $B_{122} \sim B_{203}$ | PARITY BITS |

FIG.10

(PRIOR ART)

| BIT ASSIGNMENT | EXPLANATION |
|---|---|
| $B_{110} \sim B_{113}$ | NUMBER OF CONNECTED SEGMENTS |
| $B_{114} \sim B_{117}$ | SEGMENT NO. OF SIGNAL TO BE TRANSMITTED |

FIG.17

| VALUE ($b_{113}, b_{112}, b_{111}, b_{110}$) | MEANING |
|---|---|
| 0000 | RESERVED |
| 0001 | RESERVED |
| 0010 | 2 SEGMENTS |
| 0011 | 3 SEGMENTS |
| 0100 | 4 SEGMENTS |
| ⋮ | ⋮ |
| 1100 | 12 SEGMENTS |
| 1101 | 13 SEGMENTS |
| 1110 | RESERVED |
| 1111 | INDEPENDENT TRANSMISSION |

FIG.18

| VALUE ($b_{117}, b_{116}, b_{115}, b_{114}$) | MEANING |
|---|---|
| 1111 | SEGMENT #0 |
| 1110 | SEGMENT #1 |
| 1101 | SEGMENT #2 |
| ⋮ | ⋮ |
| 0011 | SEGMENT #12 |
| 0010 | RESERVED |
| 0001 | RESERVED |
| 0000 | RESERVED |

FIG.22

| | |
|---|---|
| 000 | CONNECTED TRANSMISSION GROUP #0 |
| 001 | CONNECTED TRANSMISSION GROUP #1 |
| 010 | CONNECTED TRANSMISSION GROUP #2 |
| 011 | CONNECTED TRANSMISSION GROUP #3 |
| 100 | CONNECTED TRANSMISSION GROUP #4 |
| 101 | CONNECTED TRANSMISSION GROUP #5 |
| 110 | CONNECTED TRANSMISSION GROUP #6 |
| 111 | INDEPENDENT TRANSMISSION |

FIG.24

OFDM RECEIVING DEVICE AND OFDM RECEIVING METHOD

This is a continuation of application Ser. No. 09/834,282 filed Apr. 12, 2001 now U.S. Pat. No. 7,075,949, the entirety of which is incorporated herein by reference.

BACKGROUND OF THE INVENTION

1. Field of the Invention

This invention relates to an OFDM receiving device and also to an OFDM receiving method to be used for digital broadcasting by orthogonal frequency division multiplexing (OFDM).

2. Related Background Art

Various modulation techniques referred as orthogonal frequency division multiplexing (OFDM) have been proposed in recent years for broadcasting digital signals. With an OFDM system, a transmission band is provided with a number of orthogonally arranged sub-carriers and data are assigned to the amplitude and the phase of each sub-carrier for the purpose of digital modulation by PSK (phase shift keying) or QAM (quadrature amplitude modulation).

With OFDM, while each sub-carrier has a small bandwidth because the transmission band is divided into a number of sub-carriers and hence the modulation speed per sub-carrier is low, the overall transmission rate remains practically same as that of any conventional modulation system. Additionally, OFDM is characterized by a low symbol rate also due to the fact that a number of sub-carriers are used in parallel for signal transmission. Therefore, with OFDM, the time length of a multi-path can be reduced relative to that of a symbol in order to reduce the possible interference in the multi-path. Furthermore, with OFDM, since data are assigned to a number sub-carriers, the transmission/reception circuit can be configured by using an IFFT (Inverse Fast Fourier Transform) operational circuit for modulation and an FFT (Fast Fourier Transform) operational circuit for demodulation.

Because of the above identified advantages of OFDM, studies have been made to apply it to ground wave digital broadcasting that can be strongly affected by multi-path interference. In Japan, a standard referred to as ISDB-T (Integrated Services Digital Broadcasting—Terrestrial) have been proposed.

Meanwhile, with OFDM, each channel is normally provided with band gaps for preventing interference from the adjacent channels, which are referred to as guard bands and have a predetermined frequency bandwidth as shown in FIG. 1 of the accompanying drawing. However, the provision of guard bands inevitably increases the bandwidth occupied by each channel to consequently reduce the efficiency of frequency exploitation.

In view of this problem, the applicant of the present patent application has proposed in International Publication No. WO 00/52861 a connected transmission method (which is also referred to as concatenated transmission method) for OFDM signals, by which the center frequencies of the OFDM signals in the frequency domains of a plurality of information channels are modified respectively and then the OFDM signals in the frequency domains of the plurality of information channels are multiplexed in the sense of frequency and collectively subjected to inverse Fourier transform.

With the proposed connected transmission method for OFDM signals, when transmitting three streams of information through respective three information channels (Ch1, Ch2, Ch3), the guard bands separating the channels can be removed and the three information channels can be connected in the sense of frequency axis for signal transmission as illustrated in FIG. 2.

An OFDM transmitter adapted to connected transmission of OFDM signals will be described below in greater detail.

FIG. 3 is a schematic block diagram of an OFDM transmitter adapted to connected transmission of OFDM signals. While any number of channels can be connected together with the proposed technique, it is assumed here that three channels (Ch1, Ch2, Ch3) are connected to transmit three streams of information. Also assume that the center frequencies of the information channels in the RF band are respectively $f_1$ for the first channel, $f_2$ for the second channel and $f_3$ for the third channel as shown in FIG. 2.

The OFDM transmitter 101 comprises a first channel encoder 102-1, a second channel encoder 102-2, a third channel encoder 102-3, a first frequency converter section 103-1, a second frequency converter 103-2, a third frequency converter 103-3, a multiplexer 104, an IFFT operational circuit 105, a guard interval adder 106, an orthogonal modulator 107, a frequency converter 108 and an antenna 109.

The first channel encoder 102-1 receives an information stream as input through the first information channel. It is adapted to operate for Reed-Solomon coding, energy dispersion, interleaving, convolutional coding, mapping and configuring an OFDM frame. The first channel encoder 102-1 generates first channel data as an OFDM signal of the frequency domain of the first channel by carrying out the above operations. The center frequency of the first channel data generated as an OFDM signal of the frequency domain output from the first channel is made equal to 0.

The second channel encoder 102-2 and the third channel encoder 102-3 operate like the first channel encoder 102-1 respectively for the information stream of the second information channel and that of the third information channel. Additionally, the center frequency of the OFDM signal of the frequency domain output from the second channel (the second channel data) and that of the OFDM signal of the frequency domain output from the third channel (the third channel data) are also made equal to 0.

The first frequency converter 103-1 performs a processing operation of frequency conversion for shifting the center frequency of the first channel data (the OFDM signal of the corresponding frequency domain) output from the first channel encoder 102-1. More specifically, the first frequency converter 103-1 converts the center frequency of the first channel data from 0 to $(f_1-f_2)$.

The second frequency converter 103-2 performs a processing operation of frequency conversion for shifting the center frequency of the second channel data (the OFDM signal of the corresponding frequency domain) output from the second channel encoder 102-2. More specifically, the second frequency converter 103-2 converts the center frequency of the second channel data from 0 to $(f_2-f_2)$.

The third frequency converter 103-3 performs a processing operation of frequency conversion for shifting the center frequency of the third channel data (the OFDM signal of the corresponding frequency domain) output from the third channel encoder 102-3. More specifically, the third frequency converter 103-3 converts the center frequency of the third channel data from 0 to $(f_3-f_2)$.

It will be appreciated that the second channel data is actually not subjected to frequency conversion because it is located at the center of the three channels connected for data transmission.

The multiplexer 104 multiplexes the channel data output from the first frequency converter 103-1, the second frequency converter 103-2 and the third frequency converter 103-3 in the sense of frequency to generate a multiplexed signal.

The IFFT operational circuit 105 performs an operation of inverse Fourier transform collectively on the multiplexed signals of the three channel data as multiplexed by the multiplexer 104 to generate an OFDM signal of the base band of time domain. As shown in FIG. 4, the frequency characteristics of the generated OFDM signal of the base band are such that the center frequency of the first information channel is $(f_1-f_2)$, that of the second information channel is 0 and that of the third information channel is $(f_3-f_2)$. In the OFDM signal of the base band, the pieces of information of the first through third information channels are subjected to frequency division and multiplexing and maintain orthogonality in order to eliminate any inter-code interference among all the carrier waves.

The guard interval adder 106 adds a guard interval to the OFDM signal of the base band from the IFFT operational circuit 105. As shown in FIG. 5, each signal to be transmitted by the OFDM system is actually transmitted on the basis of a unit of symbol referred to as OFDM symbol. An OFDM symbol comprises an effective symbol representing a signal period during which an IFFT operation is performed for transmission and a guard interval where a rear part of the effective symbol is copied. The guard interval is arranged in a front part of the OFDM symbol. The guard interval adder 106 generates such a guard interval and adds it to the effective symbol.

The orthogonal modulator 107 orthogonally modulates the OFDM signal of the base band, to which a guard interval is added, relative to the carrier wave with an intermediate frequency band of frequency $f_{IF}$ and outputs an IF signal.

The frequency converter 108 multiplies the IF signal output from the orthogonal modulator 107 by the carrier wave signal with a frequency of $f_2+f_{IF}$ to produce a signal to be transmitted in an RF signal band.

The signal produced by the frequency converter 108 is then transmitted by way of the antenna 109.

Thus, as described above, the OFDM transmitter can carry out a connected transmission of OFDM signals by changing the center frequencies of the channel data of the three information channels (the OFDM signals of the frequency domains), multiplexing them in the sense of frequency and performing an operation of inverse Fourier transform collectively on the OFDM signals of the frequency domains of the information channels.

With such a connected transmission, a single operation of IFFT is performed collectively on the three channels to maintain orthogonality in order to eliminate any inter-code interference among the sub-carriers. As a result, no interference occurs in the connected three channels and therefore the OFDM transmitter 101 can transmit information for three channels without providing guard bands for preventing interferences with adjacent channels.

An OFDM receiver for receiving such a signal is adapted to detect the IF signal by tuning the oscillation frequency of the local oscillator in the center frequency of the desired information channel. For instance, the oscillation frequency of the local oscillator will be tuned in the frequency $(f_1)$ for receiving the signal of the first information channel, in the frequency $(f_2)$ for receiving the signal of the second information channel and in frequency $(f_3)$ for receiving the signal of the third information channel. The detected IF signal is then orthogonally demodulated by means of the carrier wave of the frequency $(f_{IF})$ and transformed into an OFDM signal of the base band of time domain. It will be appreciated that the center frequency of the OFDM signal of the base band is equal to 0 regardless of the information channel selected for signal reception. Then, the OFDM signal of the base band is subjected to an operation of FFT to obtain the channel data of the OFDM signal of the frequency domain by demodulation.

Thus, if the OFDM signals of the frequency domains of a plurality of information channels are multiplexed in the sense of frequency and subjected collectively to an operation of inverse Fourier transform for connected transmission, the OFDM receiver can selectively receive the signal of only one of the channels by tunning the oscillation frequency of the local oscillator in the center frequency of the desired information channel.

Now, the frame configurations as defined in the ISDB-T Standard (in the case of Mode 1) for a broadcasting mode of digital ground wave broadcasting will be discussed below.

As shown in FIGS. 6 and 7, according to the ISDB-T Standard defines the data structure of an OFDM frame for data to be transmitted. FIG. 6 illustrates the frame configuration to be used for modulating an information signal by differential modulation (differential quadrature phase shift keying—DQPSK) and FIG. 7 shows the frame configuration to be used for modulating an information signal by synchronous modulation (quadrature phase shift keying—QPSK, 16 quadrature amplitude modulation—16QAM, 64 quadrature amplitude modulation—64QAM).

Referring to FIGS. 6 and 7, a total of 108 data (with carrier numbers #0 through #107) are transmitted by a symbol. The unit of data of a symbol is referred to as OFDM symbol. Also note that 204 OFDM symbols (with symbol numbers #0 through #203) constitute an OFDM frame.

An OFDM frame contains information signals ($S_{0,0}$ through $S_{95,203}$) that are orthogonally modulated by QPSK, 16QAM or 64QAM along with various control signals such as CP (Continual Pilot) signal, TMCC (Transmission and Multiplexing Configuration Control) signal, AC (Auxiliary Channel) signal and SP (Scattered Pilot) signal.

The CP signal is a signal with a fixed phase and a fixed amplitude. When modulating the information signal by differential modulation, a CP signal is arranged at the leading carrier of each OFDM symbol (at a position where the frequency is lowest). When transmitting the information signal by connected transmission, a CP signal is arranged at the rightmost position of the connected transmission band (at a position where the frequency is highest).

The SP signal is a signal modulated by BPSK and, as shown in FIG. 7, arranged in such a way that it is inserted once in every 12 carriers in the sense of frequency and once in every 4 symbols in the sense of symbol. The SP signal is used to estimate the characteristics of the transmission path when the receiver side equalizes the waveform. Therefore it is inserted only for synchronous modulation involving waveform equalization (QPSK, 16QAM, 64QAM).

The TMCC signal and the AC signal are signals modulated also by BPSK and arranged at respective positions in each symbol as shown in FIGS. 8 and 9. FIG. 8 shows their positions in an OFDM frame for differential modulation and FIG. 9 shows their positions in an OFDM frame for synchronous modulation. The AC signal is used for the transmission of additional information, while the. TMCC signal is used for the transmission of transmission control information.

The TMCC signal carries 204-bit ($B_0$ through $B_{203}$) information that is completely contained in a unit of OFDM frame. FIG. 10 shows the contents of information assigned to a TMCC signal.

Bit $B_0$ is a bit to which the signal operating as reference for amplitude and phase of differential modulation is assigned.

Bits $B_1$ through $B_{16}$ are bits to which a sync code (synchronizing signal) to be inverted on a frame by frame basis is assigned. The receiver detects the bit pattern of the sync code to detect the synchronization of the TMCC signal and that of the OFDM frame.

Bits $B_{17}$ through $B_{19}$ are bits to which the identification signal of the segment for identifying the frame as one for synchronous modulation or for differential modulation is assigned.

Bits $B_{20}$ through $B_{121}$ are bits to which TMCC information (of 120 bits) is assigned. The TMCC information describes the carrier modulation mode of the information signal, the convolutional coding ratio, the interleave length, the number of segments and so on.

Bits $B_{122}$ through $B_{203}$ are bits to which parity bits are assigned.

The transmitter generates the OFDM frame in the frame configuring section of the channel encoder. The receiver firstly establishes the synchronism of the symbols on a symbol by symbol basis and performs an operation of FFT. Subsequently, it detects the synchronizing signal described in the TMCC signal and establishes the synchronism of the frames to decode the data contained therein.

When the receiver shifts from a channel to another, it selects the oscillation frequency of the local oscillator for another time to restart the operation of receiving an RF signal. Therefore, when shifting the channel, the receiver has to carry out for another time the operation of establishing the synchronism of the symbols on a symbol by symbol basis, performing an operation of FFT, subsequently detecting the sync code described in the TMCC signal and then establishing the synchronism of the frames to decode the data contained therein.

However, when detecting the synchronism of frames, it is necessary to detect the sync codes of at least two frames. This means that a time span longer than that of a frame period has to be spent for the detection. For instance, according to the ISDB-T Standard, the frame length of an OFDM frame is about 250 ms at most. Then, about 250 ms has to be spent to detect the synchronism of frames. If the synchronism of frames is not detected, it is no longer possible to extract the SP signal that defines the positional arrangement of frames and data on a frame by frame basis, decode the TMCC signal and identify the, switching position of puncturing. Then, no data can be output. In short, conventionally a very large amount of time has to be spent for a switching operation from the time of a channel shift to the that of outputting audio and video data after the shift.

This problem arises regardless if connected transmission is used or not.

BRIEF SUMMARY OF THE INVENTION

In view of the above identified circumstances, it is therefore the object of the present invention to provide an OFDM receiving device and an OFDM receiving method that can reduce the time necessary for switching the information channel to be used for reception.

According to the present invention, the above object is achieved by providing An OFDM receiving device for receiving an orthogonally frequency divided and multiplexed signals comprising: a receiver for selecting an information channel to be received and receiving the RF signal of the selected information channel; an orthogonal demodulator for orthogonally demodulating the signal received by said receiver and outputting an OFDM signal of a base band; a Fourier transform section for performing an operation of Fourier transform on said OFDM signal of the base band and outputting an OFDM signal of a frequency domain; a decoder for decoding said OFDM signal of the frequency domain; and a frame synchronism control section for detecting the synchronism of transmission frames of said channel data and controlling the synchronism of said decoder; said frame synchronism control section being adapted to maintain the synchronism of the transmission frames for switching the information channel to be used for signal reception among the channels connected for transmission in the case of receiving OFDM signals of frequency domains of a plurality of information channels multiplexed in a direction of frequency and collectively subjected to an operation of inverse Fourier transform for connected transmission.

With an OFDM receiving device according to the invention and having the above configuration, when the OFDM signals of frequency domains of a plurality of information channels are multiplexed and collectively subjected to an operation of inverse Fourier transform for connected transmission and the information channel is switched for signal reception among the channels connected from transmission, the synchronism of the transmission frames is maintained. In other words, with the OFDM receiving device, the synchronism of the transmission frames is not broken when switching the information channel for signal reception.

In another aspect of the invention, there is provided an OFDM receiving device for receiving an orthogonally frequency divided and multiplexed comprising: an OFDM receiving device comprising a receiver for selecting an information channel to be received and receiving an RF signal of the selected information channel; an orthogonal demodulator for orthogonally demodulating the signal received by said receiver and outputting the OFDM signal of a base band; a Fourier transform section for performing an operation of Fourier transform on said OFDM signal of the base band and outputting an OFDM signal of a frequency domain; a decoder for decoding said OFDM signal of the frequency domain; a control section for controlling said Fourier transform section and said decoder; and said OFDM signal of the base band containing information on connected transmission indicating whether the OFDM signal to be transmitted to an information channel and the OFDM signal to be transmitted to other information channels are transmitted in a connected state by multiplexing the OFDM signals of the frequency domain of a plurality of the information channel in a direction of the frequency and performing an inverse Fourier transform on the multiplexed OFDM signals collectively, said control section being adapted to determine whether the information channel being used for signal reception is coupled to the information channel to be selected for signal reception by switching by referring to said information on connected transmission.

With an OFDM receiving device according to the invention and having the above configuration, when the information channel being used for signal reception is switched to some other information channel, it is determined if the information channel being used for signal reception and the information channel to be selected-for signal reception are coupled for transmission or not as the OFDM signals of frequency domains of a plurality of information channels are multiplexed and collectively subjected to an operation of inverse Fourier transform for coupled transmission.

In still another aspect of the invention, there is also provided an OFDM receiving method for receiving orthogonally frequency divided and multiplexed signals comprising a step of maintaining the synchronism of the transmission frames for switching the information channel to be used for signal reception among the channels connected for transmission in the case of receiving OFDM signals of frequency domains of a plurality of information channels multiplexed in a direction of frequency and collectively subjected to an operation of inverse Fourier transform for connected transmission.

With the above described OFDM receiving method, when the OFDM signals of frequency domains of a plurality of information channels are multiplexed and collectively subjected to an operation of inverse Fourier transform for coupled transmission and the information channel connected for transmission is switched among the plurality of information channels, the switching operation is conducted while maintaining the synchronism of the transmission frames. In other words, with the OFDM receiving method, the synchronism of the transmission frames is not broken when switching the information channel for signal reception.

In still another aspect of the invention, there is also provided an OFDM receiving method for receiving orthogonally frequency divided and multiplexed signals comprising the steps of; receiving the OFDM signal of the base band containing information on connected transmission indicating whether the OFDM signal to be transmitted to an information channel and the OFDM signal to be transmitted to other information channels are transmitted in a connected state by multiplexing the OFDM signals of the frequency domain of a plurality of the information channels in a direction of the frequency and performing an inverse Fourier transform on the multiplexed OFDM signals collectively; and of determining whether the information channel being used for signal reception is coupled to the information channel to be selected for signal reception by switching being determined by referring to the information on the connected transmission.

With the above described OFDM receiving method, the existence or non-existence of a coupled state of the information channel being used for signal reception and the information channel to be selected for signal reception by switching is determined by referring to the information on connected transmission.

Thus, with an OFDM receiving device and an OFDM receiving method according to the invention, when the OFDM signals of frequency domains of a plurality of information channels are multiplexed and collectively subjected to an operation of inverse Fourier transform for connected transmission and the information channel is switched for signal reception among the channels connected from transmission, the synchronism of the transmission frames is maintained. In other words, with the OFDM receiving device, the synchronism of the transmission frames is not broken when switching the information channel for signal reception.

With this arrangement according to the invention, the time required for switching the information channel to be used for signal reception can be reduced so that the operation of reproducing video and audio signal and outputting data can be started very quickly.

Additionally, with an OFDM receiving device and an OFDM receiving method according to the invention and having the above configuration, when the information channel being used for signal reception is switched to some other information channel, it is determined if the information channel being used for signal reception and the information channel to be selected for signal reception are coupled for transmission or not as the OFDM signals of frequency domains of a plurality of information channels are multiplexed and collectively subjected to an operation of inverse Fourier transform for coupled transmission.

With this arrangement according to the invention, if the newly selected information channel is coupled for transmission or not can be determined with ease.

BRIEF DESCRIPTION OF THE SEVERAL VIEWS OF THE DRAWING

FIG. 8 is a schematic illustration of the positional arrangement of TMCC signals and AC signals in an OFDM frame for differential modulation;

FIG. 9 is a schematic illustration of the positional arrangement of TMCC signals and AC signal in an OFDM frame for synchronous modulation;

FIG. 10 is a schematic illustration of the contents of information contained in a TMCC signal;

FIG. 17 is a schematic illustration of the number of connected segments and the segment numbers of the signals to be transmitted as described in TMCC information;

FIG. 18 is a schematic illustration of a specific description on a number of connected segments;

FIG. 22 is a schematic illustration of a specific description on segment numbers;

FIG. 24 is a schematic illustration of the ID of a group of segments for connected transmission.

DETAILED DESCRIPTION OF THE INVENTION

Now, the present invention will be described by referring to views of the accompanying drawing that illustrate an embodiment of OFDM transmitter and an embodiment of OFDM receiver according to the invention.

Firstly, the configuration of the OFDM transmitter will be described.

Figure 11:
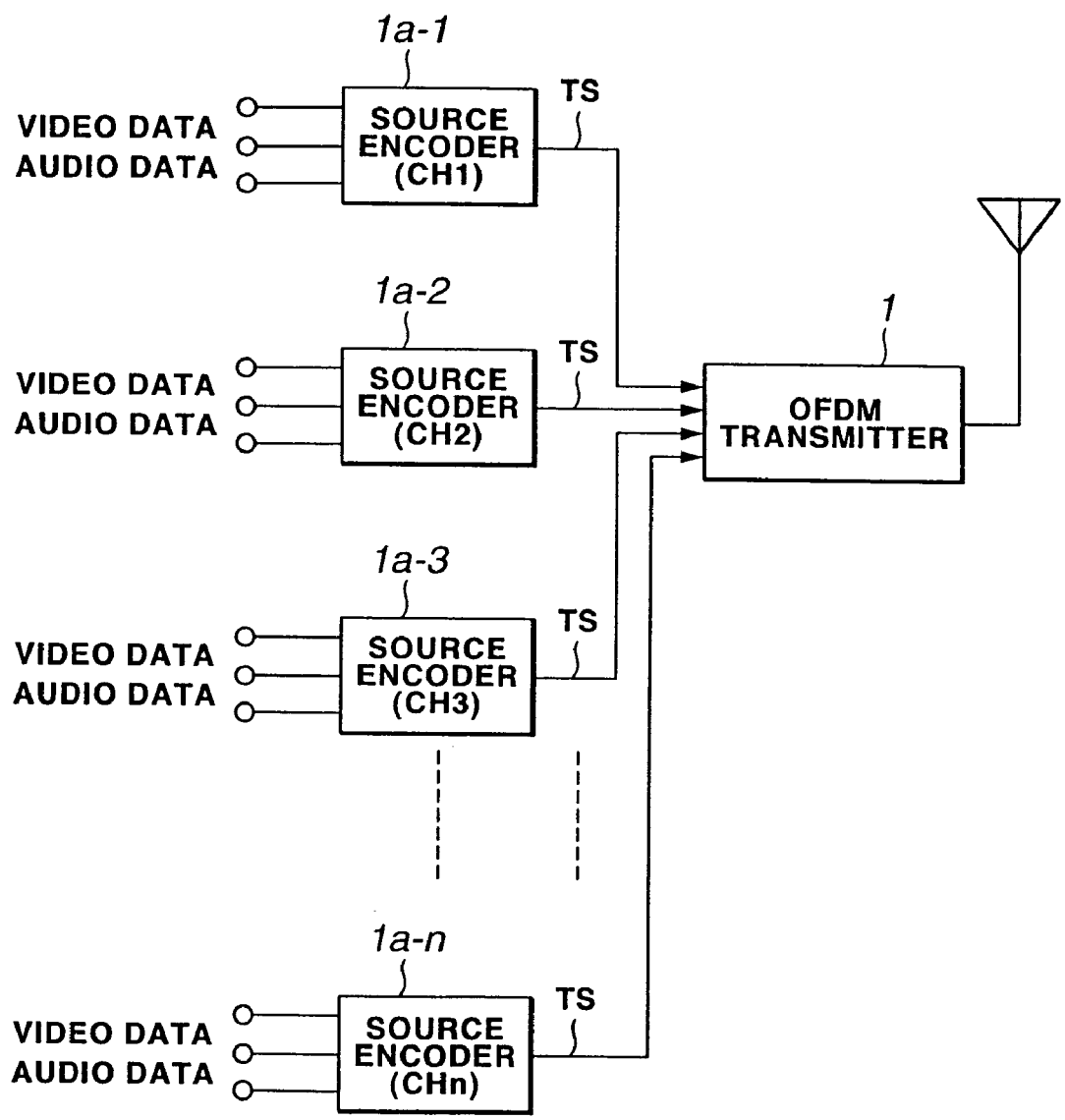
FIG. 11 is a schematic block diagram illustrating source encoders and an OFDM transmitter.

Referring to FIG. 11, the transmission side comprises a plurality of source encoders 1a (1a-1 through 1a-n) and an OFDM transmitter 1. The source encoders 1a are adapted to receive video data and audio data of a plurality of base bands, which data are then subjected to compression coding according to the MPEG-2 Systems to generate a plurality of program streams. The source encoders 1a are also adapted to multiplex the plurality of program streams into transport streams as defined in the MPEG-2 Systems. The OFDM transmitter 1 multiplexes the plurality of transport streams output from the plurality of source encoders 1a for connected transmission.

Figure 12:
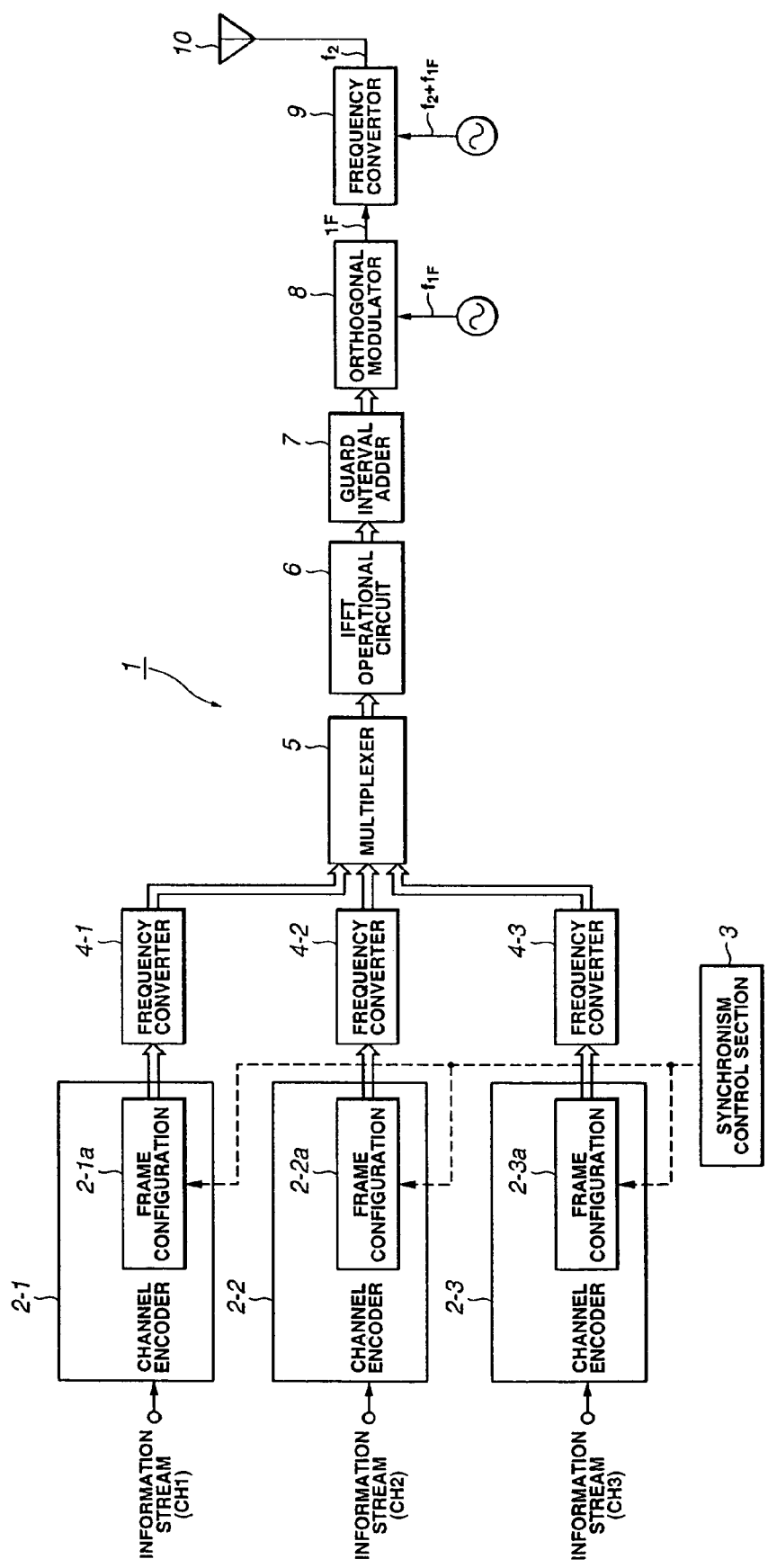
FIG. 12 is a schematic block diagram of an embodiment of OFDM transmitter according to the invention.

FIG. 12 is a block diagram of an embodiment of OFDM transmitter according to the invention.

Figure 1:
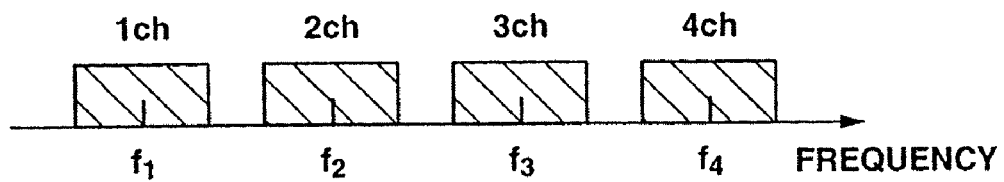
FIG. 1 is a schematic illustration of guard bands arranged between information channels.
Figure 2:
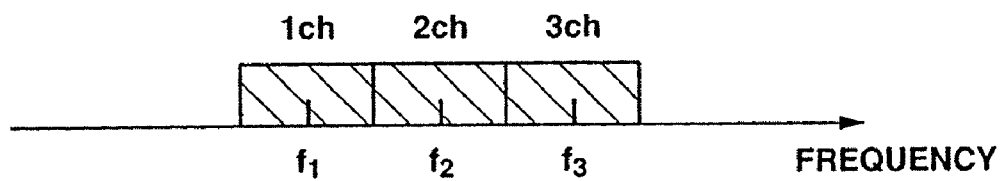
FIG. 2 is a schematic illustration of signals for connected transmission.
Figure 3:
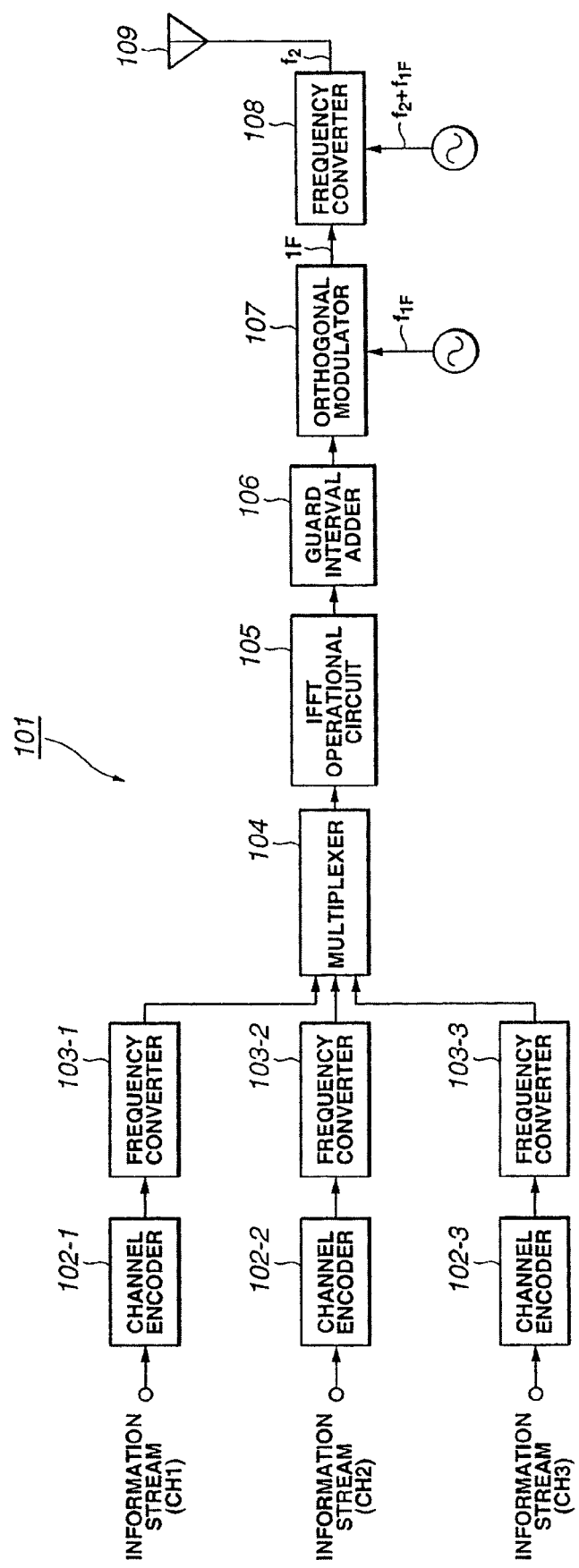
FIG. 3 is a schematic block diagram of a conventional OFDM transmitter.

Referring to FIG. 12, the OFDM transmitter is adapted to combine three channels for connected transmission as in the case of the above described conventional OFDM transmitter. Assume that the center frequencies of the information channels in an RF band are $f_1$ for the first information channel, $f_2$ for the second information channel and $f_3$ for the third information channel as shown in FIG. 2 and described earlier.

The OFDM transmitter 1 comprises a first channel encoder 2-1, a second channel encoder 2-2, a third channel encoder 2-3, a synchronism control section 3, a first frequency converter 4-1, a second frequency converter 4-2, a third frequency converter 4-3, a multiplexer 5, an IFFT operating circuit 6, an guard interval adder 7, an orthogonal modulator 8, a frequency converter 9 and an antenna 10.

Figure 6:
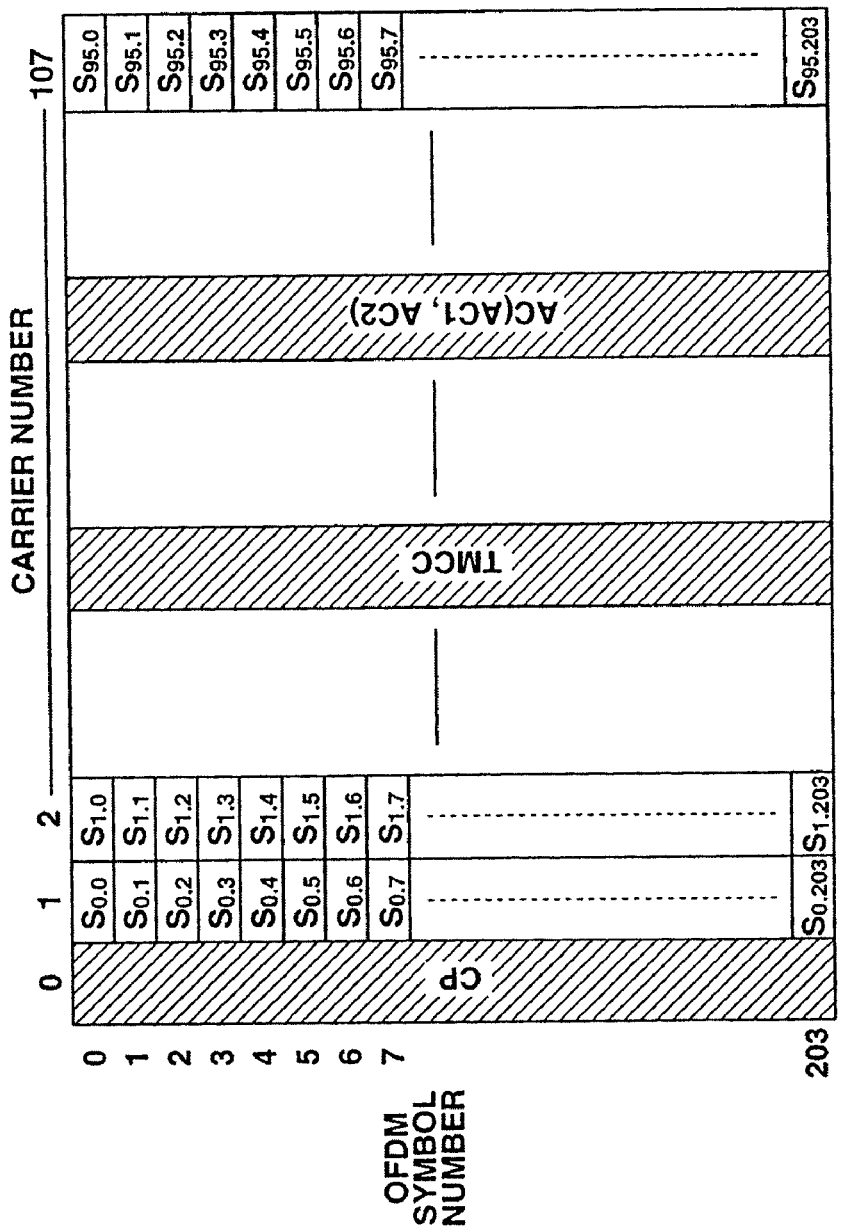
FIG. 6 is a schematic illustration of the frame configuration that can be used when modulating an information, signal by differential modulation (DQPSK)
Figure 7:
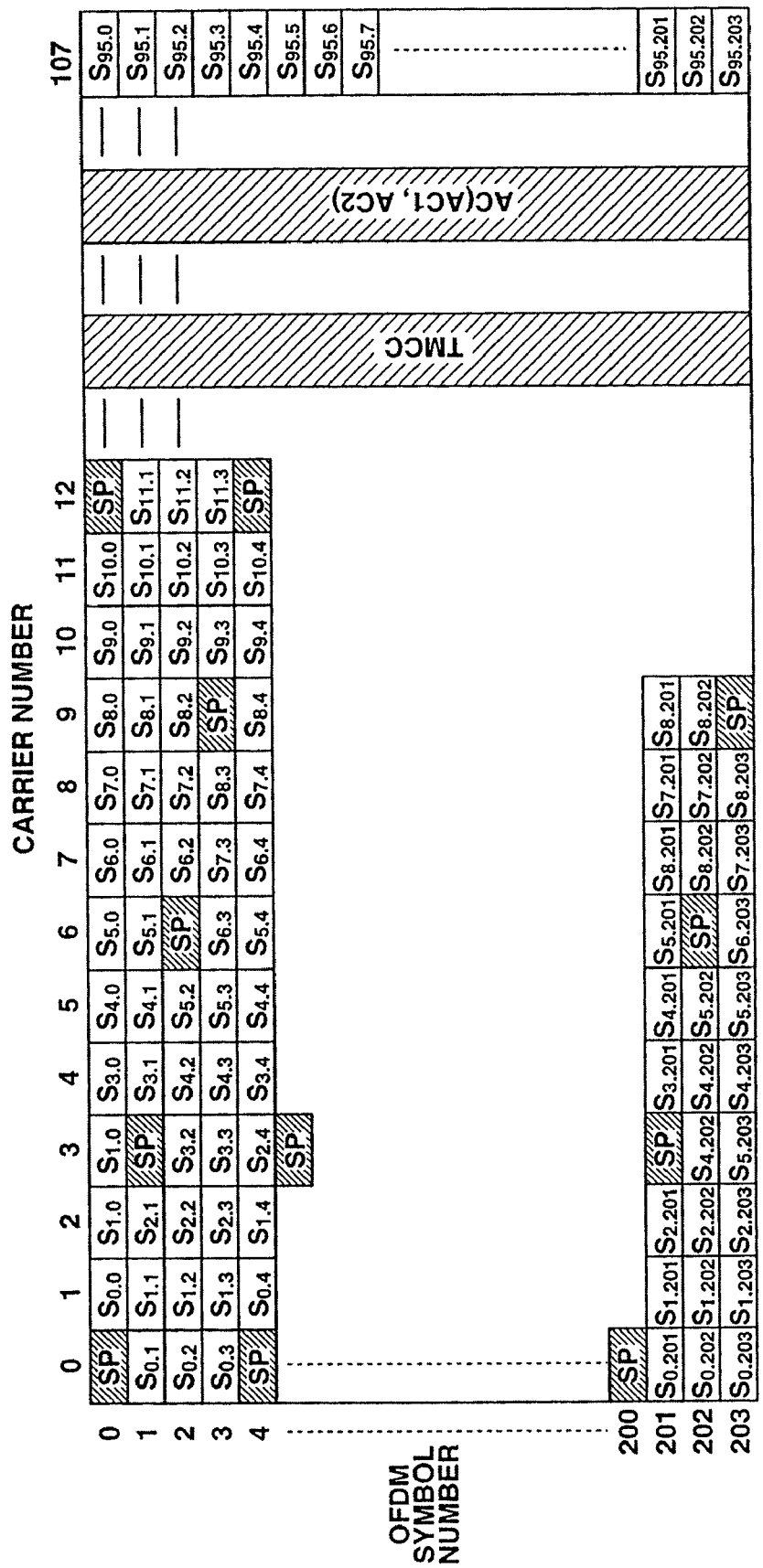
FIG. 7 is a schematic illustration of the frame configuration that can be used when modulating an information signal by synchronous modulation (QPSK, 16QAM, 64QAM)

The first channel encoder 2-1 receives an information stream as input. The first channel encoder 2-1 is adapted to perform processing operations of Reed-Solomon coding, energy dispersion, interleaving, convolutional coding, mapping, OFDM frame configuring and so on. The first channel encoder 2-1 is provided with a frame configuring section 2-1a for configuration the OFDM frame. The frame configuring section 2-1a is adapted to add a CP signal, an AC signal, a TMCC signal and an SP signal to the coded information signal to configure an OFDM frame containing 204 OFDM symbols as shown in FIGS. 6 and 7. The synchronous timing of the operation of the frame configuring section 2-1 of configuring the OFDM frame is controlled by the synchronism control section 3. More specifically, the symbol and the timing of cutting out the frame is controlled by the synchronism control section 3. The first channel encoder 2-1 performs the above processing operation to generate first channel data as OFDM signal of a frequency domain. The center frequency of the first channel data, or the OFDM signal of the frequency domain, is made equal to 0.

The second channel encoder 2-2 and the third channel encoder 2-3 operate just like the first channel encoder 2-1 respectively for the information stream of the second information channel and that of the third information channel. Similarly, the second channel encoder 2-2 and the third channel encoder 2-3 are provided with respective frame configuring sections 2-2a and 2-3a for configuration the respective OFDM frames. Again, the synchronous timing of the operation of the frame configuring section 2-2a and that of the frame configuring section 2-3a of configuring the respective OFDM frames are controlled by the synchronism control section 3. The center frequencies of the OFDM signals of the frequency domains of the second channel encoder 2-2 and the third channel encoder 2-3 (the second channel data and the third-channel data) are also made equal to 0.

The synchronism control section 3 controls the synchronous timing of the OFDM frame for the first channel encoder 2-1, that of the OFDM frame for the second channel encoder 2-2 and that of the OFDM frame for the third channel encoder 2-3. In other words, the synchronism control section 3 controls the synchronism of the frames in such a way that all the OFDM frames of the first through third channel data temporally agree with each other. More specifically, the synchronous timing of each of the OFDM frames is so controlled that the timing of the leading OFDM symbol (#0) of each of the OFDMs is made to agree with those of the leading OFDM symbols of the remaining channels.

The first frequency converter 4-1 performs an operation of frequency conversion to shift the center frequency of the first channel data (the OFDM signal of the frequency domain) output from the first channel encoder 2-1. More specifically, the first frequency converter 4-1 shifts the center frequency of the first channel data from 0 to $(f_1-f_2)$.

The second frequency converter 4-2 performs an operation of frequency conversion to shift the center frequency of the second channel data (the OFDM signal of the frequency domain) output from the second channel encoder 2-2. More specifically, the second frequency converter 4-2 shifts the center frequency of the second channel data from 0 to $(f_2-f_2)$.

The third frequency converter 4-3 performs an operation of frequency conversion to shift the center frequency of the third channel data (the OFDM signal of the frequency domain) output from the third channel encoder 2-3. More specifically, the third frequency converter 4-3 shifts the center frequency of the third channel data from 0 to $(f_3-f_2)$.

Figure 13:
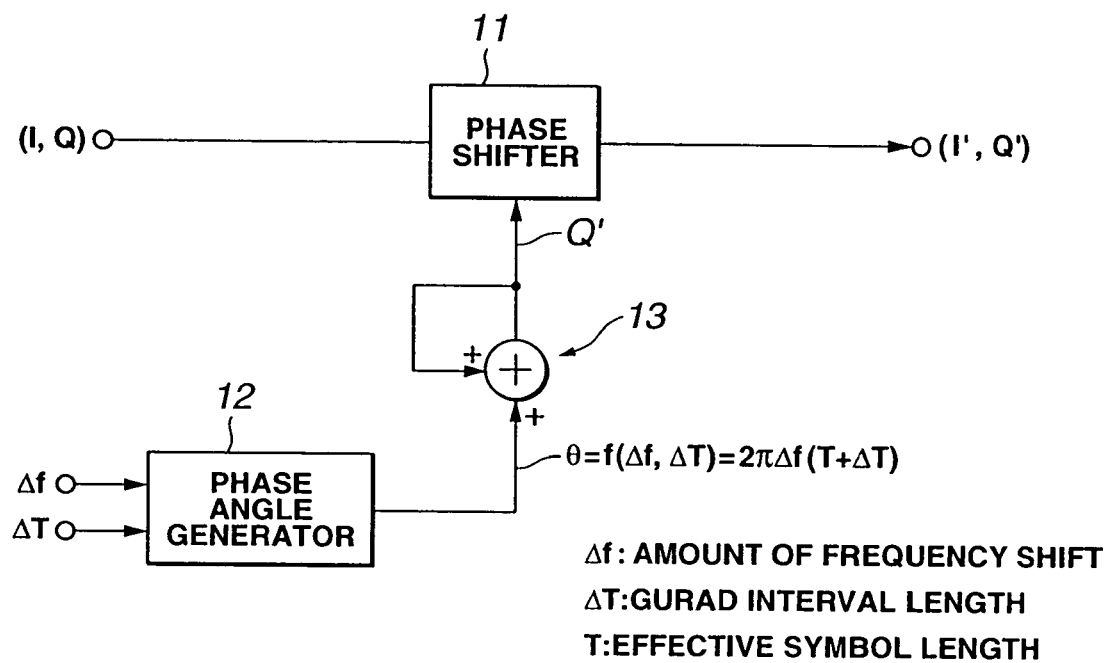
FIG. 13 is a schematic block diagram of the frequency converter of the embodiment of FIG. 12.

FIG. 13 shows a circuit diagram of the first frequency converter 4-1, the second frequency converter 4-2 and the third frequency converter 4-3.

The frequency conversion circuit comprises a phase shifter 11, a phase angle generator 12 and an accumulator 13.

The phase shifter 11 receives as input a complex signal mapped according to a given modulation system such as BPSK, DQPSK, QPSK, 16QAM or 64QAM. The signal point of the input complex signal is expressed by (I, Q). The phase angle generator 12 receives as input the quantity of frequency shift $\Delta f$ and the length of guard interval $\Delta T$. The quantity of frequency shift $\Delta f$ represents the difference between the center frequency of the RF frequency band of each information channel and the center frequency of the RF frequency band of the multiplexed signal for connected transmission. Therefore, the quantity of frequency shift $\Delta f$ of the first information channel is equal to $(f_1-f_2)$ and that of frequency shift between the $\Delta f$ of the second information channel is equal to $(f_2-f_2)$, while that of frequency shift $\Delta f$ of the third information channel is equal to $(f_3-f_2)$.

The phase angle generator 12 generates a phase angle θ by using formula (1) below;

$$\theta = f(\Delta f, \Delta T) = 2\pi 66 f(T+\Delta T) \tag{1}$$

where T is the effective symbol period of the OFDM signal of the base band.

The phase angle generated by the phase angle generator 12 is input to the accumulator 12.

The accumulator 12 accumulates the input phase angle θ for each symbol and outputs the accumulated value θ'. The accumulated value θ' is then input to the phase shifter 11.

The phase shifter 11 substitutes the accumulated value θ' for formula (2) below to shift the frequency for the signal point (I, Q).

$$\begin{pmatrix} I_{out}(n) \\ Q_{out}(n) \end{pmatrix} = \begin{pmatrix} \cos\theta_{clk(n)} & -\sin\theta_{clk(n)} \\ \sin\theta_{clk(n)} & \cos\theta_{clk(n)} \end{pmatrix} \begin{pmatrix} I_{in}(n) \\ Q_{in}(n) \end{pmatrix} \quad (2)$$

The first frequency converter 4-1, the second frequency converter 4-2 and the third frequency converter 4-3 outputs the obtained signal point (I', Q') to the multiplexer 5.

It will be appreciated that the second channel data is actually not subjected to frequency conversion because it is located at the center of the three channels connected for data transmission.

The multiplexer 5 multiplexes the channel data output from the first frequency converter 4-1, the second frequency converter 4-2 and the third frequency converter 4-3 in the sense of frequency to generate a multiplexed signal. The multiplexed signal obtained by the multiplexing contains the first information channel, the second information channel and the third information channel in the sense of frequency and synchronized for the frames on time base.

Figure 4:
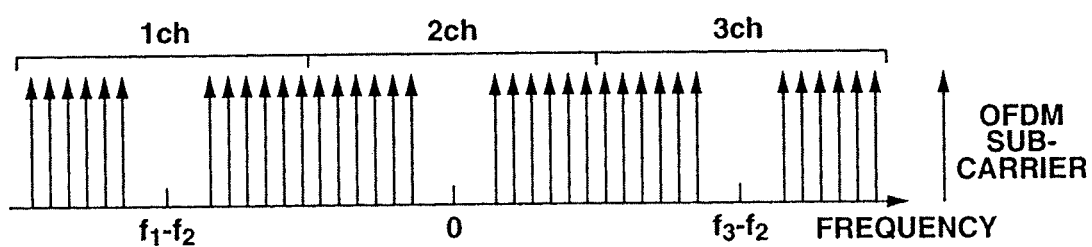
FIG. 4 is a schematic illustration of the frequency characteristics of OFDM signals of base bands obtained by performing an operation of IFFT collectively for three channels.
Figure 5:
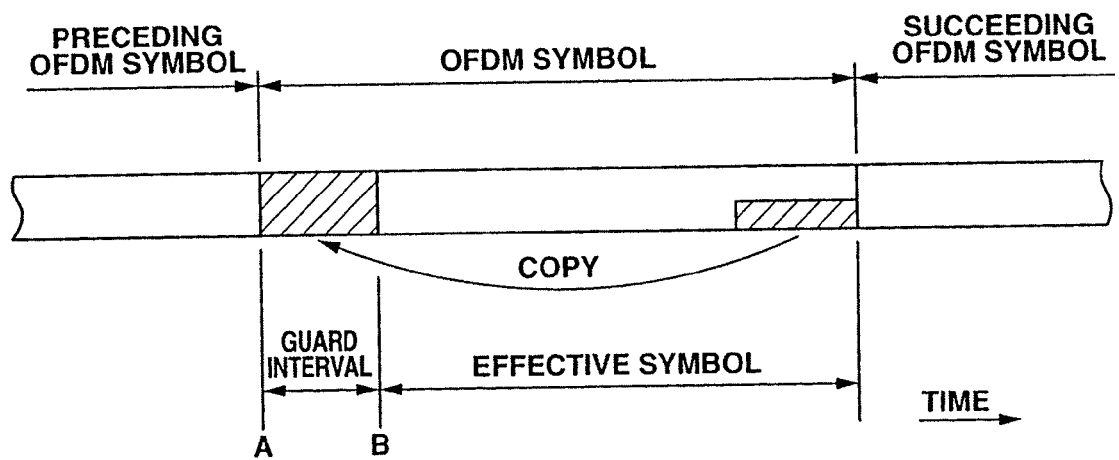
FIG. 5 is a schematic illustration of OFDM symbols containing guard intervals.

The IFFT operational circuit 6 performs an operation of inverse Fourier transform collectively on the multiplexed signals of the three channel data as multiplexed by the multiplexer 5 to generate an OFDM signal of the base band of time domain. As shown in FIG. 4, the frequency characteristics of the generated OFDM signal of the base band are such that the center frequency of the first information channel is ($f_1-f_2$), that of the second information channel is 0 and that of the third information channel is ($f_3-f_2$). In the OFDM signal of the base band, the pieces of information of the first through third information channels are subjected to frequency division and multiplexing-and maintain orthogonality in order to eliminate any inter-code interference among all the carrier waves.

The guard interval adder 7 adds a guard interval to the OFDM signal of the base band from the IFFT operational circuit 6.

The orthogonal modulator 8 orthogonally modulates the OFDM signal of the base band, to which a guard interval is added, relative to the carrier wave with an intermediate frequency band of frequency $f_{IF}$ and outputs an IF signal.

The frequency converter 9 multiplies the IF signal output from the orthogonal modulator 8 by the carrier wave signal with a frequency of $f_2+f_{IF}$ to produce a signal to be transmitted in an RF signal band.

The signal produced by the frequency converter 9 is then transmitted by way of the antenna 10.

Thus, as described above, the OFDM transmitter 1 can carry out a connected transmission of OFDM signals by changing the center frequencies of the channel data of the three information channels (the OFDM signals of the frequency domains), multiplexing them in the sense of frequency and performing an operation of inverse Fourier transform collectively on the OFDM signals of the frequency domains of the information channels.

With such a connected transmission, a single operation of IFFT is performed collectively on the three channels to maintain orthogonality in order to eliminate any inter-code interference among the sub-carriers. As a result, no interference occurs in the connected through channels and therefore the OFDM transmitter 101 can transmit information for three channels without providing guard bands for preventing interferences with adjacent channels.

Additionally, the OFDM transmitter 1 synchronizes the OFDM frames of the plurality of information channel that are connected for transmission.

Now, the configuration of the reception side will be described.

Figure 15:
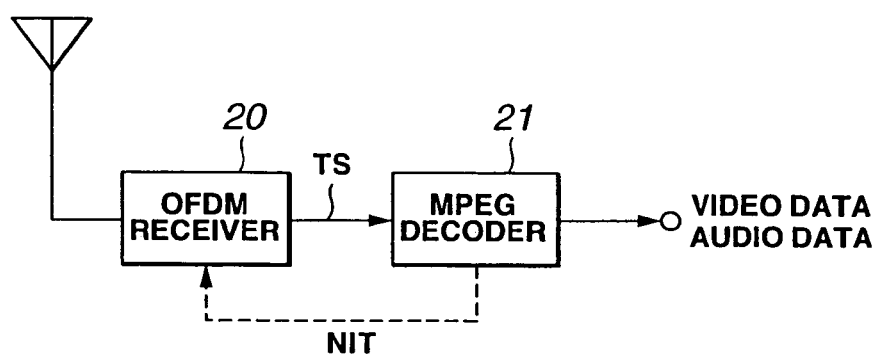
FIG. 15 is a schematic block diagram illustrating an OFDM transmitter and an MPEG decoder.

Referring to FIG. 15, the reception side comprises an OFDM receiver 20 and an MPEG decoder 21. The OFDM receiver 20 is adapted to receive the broadcast wave transmitted from the OFDM transmitter 1 and demodulates the transport streams of the MPEG-2 Systems. The MPEG decoder 21 selects an appropriate program stream out of the demodulated transport streams and MPEG-decodes it in order to output video data and audio data.

Figure 16:
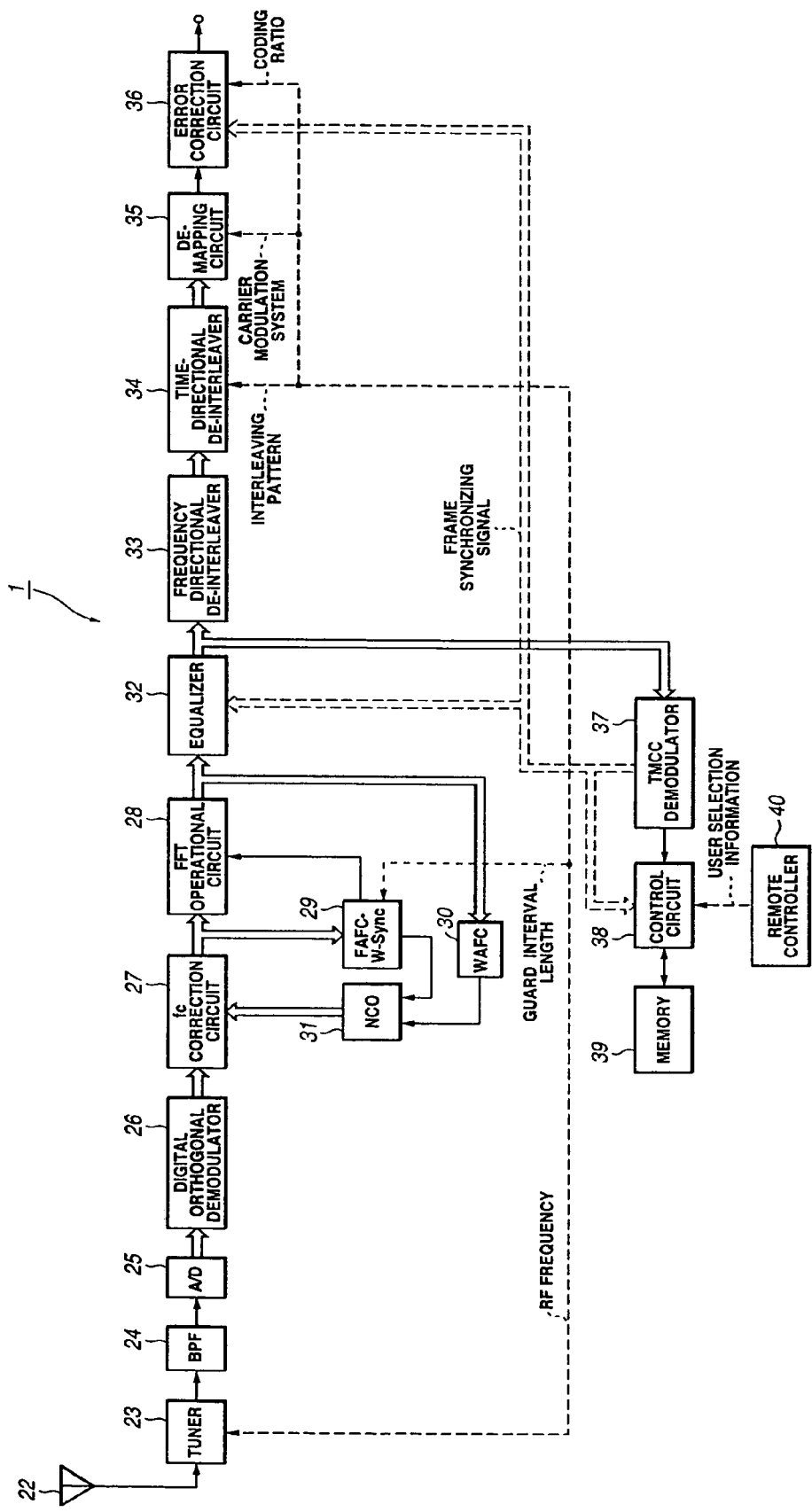
FIG. 16 is a schematic block diagram of an embodiment of OFDM receiver according to the invention.

FIG. 16 is a schematic block diagram of an embodiment of OFDM receiver according to the invention.

Referring to FIG. 16, the OFDM receiver 20 comprises an antenna 22, a tuner 23, a bandpass filter (BPF) 24, an A/D converter 25, a digital orthogonal demodulator 26, an fc correction circuit 27, an FFT operational circuit 28, a narrow band fc error computing window sync (FAFC·W-Sync) circuit 29, a broad band fc error computing (WAFC) circuit 30, a numerical value control oscillator (NCO) 31, an equalizer 32, a frequency-directional de-interleaver 33, a time-directional de-interleaver 34, a de-mapping circuit 35, an error correction circuit 36, a TMCC demodulator 37, a control section 38 and a memory 39.

The broadcast wave transmitted from said OFDM transmitter 1 is received by way of the antenna 22 of the OFDM receiver 20 and fed to the tuner 23 as an RF signal.

The RF signal received by the antenna 22 is subjected to frequency conversion by the tuner 23 typically comprising a local oscillator and a multiplier to produce an IF signal, which IF signal is then fed to the BPF 4. The local oscillation frequency of the tuner 23 is selected by the control section 38 so as to correspond to the channel selected by the user. For example, if the first information channel (CH1) is used for signal reception, the local oscillation frequency is tuned to ($f_1$). If the second information channel (CH2) is used for signal reception, the local oscillation frequency is tuned to ($f_2$). Similarly, if the third information channel (CH3) is used for signal reception, the local oscillation frequency is tuned to ($f_3$). The IF signal output from the tuner 23 filtered by the BPF4 and subsequently digitized by the A/D converter 25 before fed to the digital orthogonal demodulator 26.

The digital orthogonal demodulator 26 orthogonally demodulates the digitized IF signal by means of a carrier signal with a predetermined frequency ($f_c$: carrier frequency) and outputs the OFDM signal of the base band. The OFDM signal of the base band output from the digital orthogonal demodulator 26 is a signal of so-called time domain before being subjected to an FFT operation. As the OFDM signal of the base band of time domain is orthogonally demodulated, an complex signal having a real axis component (I channel signal) and an imaginary axis component (Q channel signal). The OFDM signal of the base band output from the digital orthogonal demodulator 26 is then fed to the fc correction circuit 27.

The fc correction circuit 27 performs a complex multiplication of the fc error correction signal output from the NCO 31 and the base band OFDM signal to correct the carrier frequency error of the base band OFDM signal. The carrier frequency error is the positional error of the center frequency of the base band OFDM signal typically produced by the displacement of the reference frequency output from the local oscillator. The error rate of the output data increases as this error becomes significantly large. The base band OFDM signal corrected for the carrier frequency error by the fc correction circuit 27 is then fed to the FFT operational circuit 28 and the FAFC·W-Sync circuit 29.

The FFT operational circuit 28 performs an FFT operation on the base band OFDM signal and extracts and outputs the data orthogonally modulated relative to each sub-carrier. The signal output from the FFT operational circuit 28 is a signal of so-called a frequency domain that has been subjected to an FFT operation.

The FFT operational circuit 28 takes out a signal within the effective range of symbol length (e.g., of 256 samples) from a single OFDM symbol to remove the guard interval from the single OFDM symbol and performs an FFT operation on the taken out base band OFDM signal. More specifically, the position for starting the FFT operation is anywhere between the boundary of the OFDM symbol to the end position of the guard interval. This range of operation is referred to as FFT window.

The OFDM signal of the frequency domain output from the FFT operational circuit 28 is a complex signal having a real axis-component (I channel signal) and an imaginary axis component (Q channel signal) like the base band OFDM signal of time domain. The OFDM signal of the frequency domain is then fed to the WAFC circuit 30 and the equalizer 32.

The FAFC·W-Sync circuit 29 and the WAFC circuit 30 compute the carrier frequency errors contained in the output signal of the fc correction circuit 27. More specifically, the FAFC·W-Sync circuit 29 is responsible for computing the narrow band fc error with an accuracy level of $\pm\frac{1}{2}$ or less of the frequency gap of sub-carriers and the WAFC circuit 30 computes the broad band fc error with an accuracy level of the frequency gap of sub-carriers. The carrier frequency errors as determined by the FAFC circuit 29 and the WAFC circuit 30 are then fed to the NCO 31.

The FAFC·W-Sync circuit 29 also determines the timing of starting the FFT operation of the FFT operational circuit 28 and control the scope of the FFT operation (FFT window). The operation of controlling the FFT window is conducted on the basis of the information on the boundary position of the OFDM symbol obtained when computing the narrow band carrier frequency error with the accuracy level of $\pm\frac{1}{2}$ or less of the frequency gap of sub-carriers and the length of the guard interval of the OFDM signal. The ISDB-T Standard defines four patterns for the length of guard interval. They are $\frac{1}{4}$, $\frac{1}{8}$, $\frac{1}{16}$ and $\frac{1}{32}$ in terms of the ratio to the length of the effective symbol. The length of the guard interval of the received OFDM signal is selected by the control section 38.

The NCO 31 adds the narrow band carrier frequency error with the accuracy level of $\pm\frac{1}{2}$ or less of the frequency gap of sub-carriers as computed by the FAFC circuit 29 and the broad band fc error with the accuracy level of the frequency gap of sub-carriers as computed by the WAFC circuit 30 and outputs the fc error correction signal obtained by adding them, the frequency of which fc error correction signal increases or decreases as a function of the carrier frequency error obtained by the addition. The fc error correction signal is a complex signal to be fed to the fc correction circuit 27. The fc error correction signal is then subjected to a complex multiplication with the base band OFDM signal by the fc correction circuit 27 to remove the carrier frequency error component of the base band OFDM signal.

The equalizer 32 equalizes the phase and the amplitude of the OFDM signal of the frequency domain typically by using a scattered pilot signal (SP signal). The OFDM signal of the frequency domain equalized for the phase and the amplitude is then fed to the frequency-directional de-interleaver 33 and the TMCC decoder 37. If the transmitted signal is a signal that is subjected to differential modulation (DQPSK), the operation of the equalizer 32 is not required.

The frequency-directional de-interleaver 33 de-interleaves the data that is interleaved in the sense of frequency at the transmitter side according to the interleaving pattern of the signal. The frequency-directional de-interleaved data is then fed to the time-directional de-interleaver 34.

The time-directional de-interleaver 34 de-interleaves the data interleaved in the sense of time at the transmitter side according to the interleaving pattern of the signal. The ISDB-T Standard defines five interleaving patterns for each mode. For instance, five patterns that make the numbers of delay correction symbols equal to 0, 28, 56, 112 and 224 respectively are defined. The interleaving pattern to be used for the de-interleaving operation is selected by the control section 38. The data that is de-interleaved in the sense of time is then fed to the de-mapping circuit 35.

The de-mapping circuit 35 performs a de-mapping operation according to a predetermined carrier modulation system and demodulates the data that ore orthogonally modulated in the respective sub-carriers of the OFDM signal of the frequency domain. The ISDB-T Standard defines the demodulation systems of DQPSK, QPSK, 16QAM and 64QAM. The mapping pattern required for the de-mapping operation of the de-mapping circuit 35 is selected by the control section 38. The data demodulated by the de-mapping circuit 35 is then fed to the error correction circuit 36.

The error correction circuit 36 performs a Viterbi decoding operation on the data encoded by using punctured convolutional codes at the transmitter side and an error correcting operation by using the Reed-Solomon codes added thereto as external codes. The ISDB-T Standard defines the coding ratios of punctured convolutional codes of $\frac{1}{2}$, $\frac{2}{3}$, $\frac{3}{4}$, $\frac{5}{6}$ and $\frac{7}{8}$. the coding ratios of punctured convolutional codes to be used for the Viterbi decoding is selected by the control section 38.

The data corrected for errors by the error correction circuit 36 is then typically fed to an MPEG decoder arranged downstream.

The TMCC decoder 37 extracts the TMCC signal inserted at the predetermined sub-carrier position in the symbol and decode the information described in the TMCC signal. The TMCC signal typically contains the system identifying information of the television broadcasting system, the count down information for switching the TMCC information, the starting flag for broadcasting an emergency warning signal, the segment identifying flag, the carrier modulation system, the convolutional coding ratio and the time-directional interleaving pattern. The TMCC decoder 37 feeds the control section 38 with the decoded various pieces of information.

The TMCC decoder 37 also detects the sync code (synchronous code) of the TMCC signal to generate a frame synchronizing signal. The frame synchronizing signal specifies the frame period of a frame and the leading position of the frame of the received OFDM signal that become ON at a predetermined position (e.g., the head) of the OFDM frame. The TMCC decoder 37 generates the frame synchronizing signal typically by applying a PPL for synchronized clock regeneration on the basis of the sync code of the TMCC signal. The frame synchronizing signal is fed to the equalizer 32, the error correction circuit 36 and the control section 38 and used for controlling the synchronized timing and the punctured switch timing of the SP signal.

The control section 38 controls the components and the overall operation of the OFDM receiver. The control section 38 receives the pieces of information decoded by the TMCC decoder 37 as input and uses them for controlling the components of the OFDM receiver and selecting parameters for it. The control section 38 additionally reads the information stored in the memory 39 and uses it for controlling the components of the OFDM receiver and selecting parameters for it.

For each information channel to be used for receiving broadcast information contents, the RF frequency of the information channel, the guard interval length of the OFDM signal of the information channel, the time-directional interleaving pattern, the carrier modulation system and the convolutional coding ratio that are described in the TMCC signal are preset in the memory 39. Additionally, the initial value of the fc error correction signal fed to the fc correction circuit 27, the correction value with the accuracy level of the gap of carrier waves to be output from the WAFC circuit 36 and the initial value of the clock frequency of the sampling clock to be fed to the A/D converter 25 are also preset in the memory 39.

The remote controller 40 is used by the user to select the information channel providing the program to be viewed and listened to by the user and the information on the selection is transmitted to the control section 38 typically by infrared communication. The user may select the information channel by referring to the program guide of a newspaper or by referring to the EPG (Electric Program Guide) displayed on the monitor screen.

Now, the operation of starting the reception of signals when the power supply is turned on, when a channel other than those of connected transmission is selected and when the selected channel of connected transmission is switched to another will be discussed below.

The operation of starting the reception of signals when the power supply is turned on proceeds in a manner as described below.

Firstly, the user turns on the power supply and then selects an information channel by means of the remote controller 40. Then, the information specifying the selected information channel is fed to the control section 38 as user selection information.

The control section 38 reads the RF frequency, the guard interval length, the interleaving pattern, the carrier modulation system, the convolutional coding ratio, the initial value of the fc error correction signal and the sampling frequency of the information channel selected by the user from the memory 39. Then, the control section 38 selects the local oscillation frequency of the tuner 23, the guard interval length of FAFC·W-Sync 9, the interleaving pattern of the time-directional de-interleaver 34, the convolutional coding ratio of the error correction circuit 36, the initial value of the fc error correction signal to be fed to the fc correction circuit 27 and the initial value of the clock frequency of the sampling clock to be fed to the A/D converter 25 on the basis of the information read out from the memory 39 in order to start the reception of signals through the selected information channel.

As the above values are selected by the control section 38, the OFDM receiver starts receiving signals.

Thus, with the OFDM receiver 20, the information channel to be used for receiving broadcast information contents, the RF frequency of the information channel, the guard interval length of the OFDM signal broadcast through the information channel, the contents of the TMCC signal added to the OFDM signal of the information channel (e.g., the time-directional interleaving pattern, the carrier modulation system and the convolutional coding ratio) the value of the clock frequency and the initiative value of the fc error correction signal are preset in the memory 39. Therefore, as the user selects the information channel for receiving signals, various values are selected according to the information preset in the memory 39.

If the guard interval information stored in the memory 39 is wrong and the stored value differs from the guard interval length of the OFDM signal that is actually received so that the signal is not correctly demodulated (and hence, for example, the TMCC signal is not detected), it may be so arranged that the guard interval length is searched and selected for another time.

The operation of starting the reception of signals when a channel other then those of connected transmission is selected proceeds in a manner as described below.

Firstly, if the user who is receiving signals through an information channel wants to switch to some other information channel, he or she selects the desired information channel by means of the remote controller 40. Then, the information specifying the selected information channel is fed to the control section 38 as user selection information.

The control section 38 reads the RF frequency, the guard interval length, the interleaving pattern, the carrier modulation system and the convolutional coding ratio of the information channel selected by the user from the memory 39. Then, the control section 38 selects the local oscillation frequency of the tuner 23, the guard interval length of FAFC·W-Sync 9, the interleaving pattern of the time-directional de-interleaver 34 and the convolutional coding ratio of the error correction circuit 36 on the basis of the information read out from the memory 39 in order to start the reception of signals through the selected information channel.

Additionally, the control section 38 holds the sampling clock frequency and the value of the fc error correction signal fed to the fc correction circuit 27 (the correction value with the accuracy level of the gap of carrier waves as output from the WAFC circuit 36 and the correction value with the accuracy level of less than the gap of carrier wave as output from the FAFC circuit 29) to the respective values selected before the switch to the newly selected channel.

As the above values are selected by the control section 38, the OFDM receiver starts receiving signals.

Thus, with the OFDM receiver 20, the clock frequency and the value of the fc error correction signal are held to the respective values selected before the switch to the new channel to start the reception of signal through the new channel. With this arrangement, it is possible to reduce the pull-in time for clock synchronization and for carrier frequency synchronization.

The operation of starting the reception of signals when the selected channel of connected transmission is switched to another proceeds in a manner as described below.

Firstly, if the user who is receiving signals through an information channel of connected transmission wants to switch to some other information channel also of connected transmission, he or she selects the desired information channel by means of the remote controller 40. Then, the information specifying the selected information channel is fed to the control section 38 as user selection information.

The control section 38 reads the RF frequency, the interleaving pattern, the carrier modulation system and the convolutional coding ratio of the information channel selected by the user from the memory 39. Then, the control section 38 selects the local oscillation frequency of the tuner 23, the guard interval length of FAFC·W-Sync 9, the interleaving pattern of the time-directional de-interleaver 34 and the convolutional coding ratio of the error correction circuit 36 on the basis of the information read out from the memory 39 in order to start the reception of signals through the selected information channel.

Additionally, the control section 38 holds the position of the FFT window, the sampling clock frequency of the A/D converter 35 and the value of the fc error correction signal fed to the fc correction circuit 27 (the correction value with the accuracy level of the gap of carrier waves as output from the WAFC circuit 36 and the correction value with the accuracy level of less than the gap of carrier wave as output from the FAFC circuit 29) to the respective values selected before the switch to the newly selected channel. Since the channels are those of connected transmission, the guard interval length remains unchanged before and after the switch to the newly selected channel. Thus, the FFT window can be held to the synchronized state if its position is unchanged so that the pull-in time required for synchronizing the FFT window can be reduced.

Figure 14:
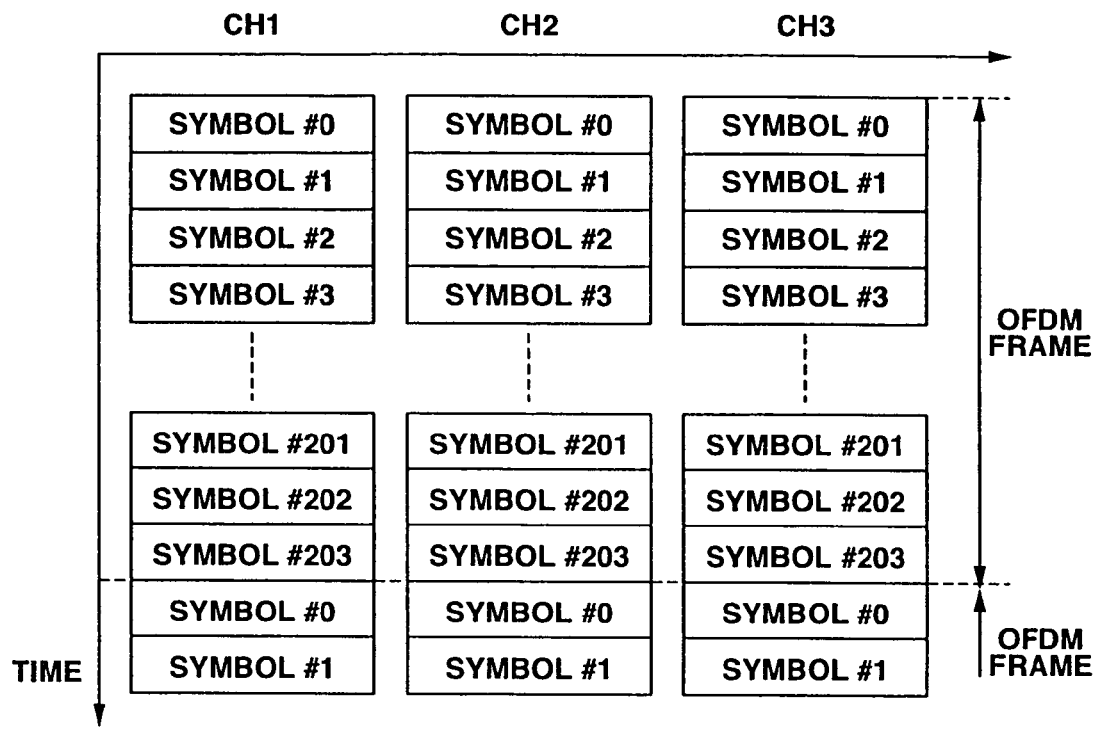
FIG. 14 is a schematic illustration of the frame synchronization of multiplexed OFDM signals.

Still additionally, the frame synchronization is held unchanged if the information channel of connected transmission is switched to another information channel also of connected transmission. According to the invention, as shown in FIG. 14, the frame configuration of each information channel is so designed for connected transmission that the timing of transmission of each frame is synchronized with that of another. In other words, the timing of frame synchronization agree among the information channels. Thus, when an information channel of connected transmission is switched to another also of connected transmission, the timing of frame synchronization of the information channel selected before the switch can be used for controlling the frame synchronization of the newly selected information channel without problem.

As the frame synchronization is held unchanged if the information channel of connected transmission is switched to another information channel also of connected transmission, no additional pull-in operation is required for frame synchronization so that the operation of reproducing audio and video signals and that of decoding data can be started quickly.

The operations of the synchronizing circuit for the above described three different types of reception are summarized in the table below.

Operations of Synchronizing Circuit

| type of synchronization | power supply ON | selection of a channel other then those of connected transmission | selection of a channel also of connected transmission |
| --- | --- | --- | --- |
| FFT wind position | reset | reset | maintained |
| clock frequency | loading initial values | maintained | maintained |
| carrier wave frequency (carrier wave gap) | loading initial values | loading of initial values or maintained | loading of initial values or maintained |
| carrier wave frequency (intra-carrier wave gap) | reset | maintained | maintained |
| frame synchronization | reset | reset | maintained |

The initial value of the fc error correction signal is selected in such a way that the fc error to be output when the RF frequency of an information channel is received for the first time is estimated in advance and the fc error can be cancelled at the time of the start of the signal reception. The pull-in time required for carrier frequency synchronization can be reduced by selecting such an initial value. If the frequency of the local oscillator of the tuner 23 is highly accurate, the fc error can practically remain unchanged if the channel shows a frequency shift to a certain extent. If such is the case, the pull-in time required for carrier frequency synchronization can be reduced by holding the value of the fc error correction signal unchanged before and after the switch of the information channel. However, it may be appreciated that an initial value may have to be selected when the fc error can vary remarkably at the time of switching the channel.

As described in detail above, with this embodiment of OFDM transmitter 1, the OFDM signals of a plurality of frequency domains are multiplexed in the sense of frequency and collectively subjected to an operation of inverse Fourier transform for connected transmission so as to synchronize the transmission frames to generate OFDM signals of the respective frequency domains.

Additionally, with this embodiment of OFDM transmitter 20, as a result of connected transmission, when an information channel of connected transmission is switched to another also of connected transmission, the synchronism of the transmission frames is maintained after the switch. In other words, the synchronism of the transmission frames is discontinued for the switch of the information channel.

As a result, the switch time required for shifting the information to be used for signal reception can be reduced and the operation of reproducing video and audio signals and outputting data can be started very quickly.

While the number of connected channels is three in the above description, it should be noted that any number of information channels can be connected for the purpose of the invention.

When shifting the information channel being used for signal reception, it is necessary to determine if the newly selected information channel is connected with the previously selected information channel for transmission or not.

The group of information channels connected for transmission may be predefined as a system so that it can be determined with ease if the newly selected information channel is connected with the previously selected information channel for transmission or not. However, with such an arrangement, once the number of information connected for transmission and the RF frequency are defined for the system before the start of broadcasting, they can no longer modified and hence the system cannot be operated flexibly to accept one or more than one additional broadcasting stations. In view of this problem, it is therefore desirable to determine if the newly selected information channel is connected with the previously selected information channel for transmission or not on the basis of the information contained in the signal transmitted through the information channel that is selected before the switch.

Therefore, according to the invention, the information on connected transmission on which if the previously selected information channel and the newly selected information channel are connected for transmission or not is described in the TMCC signal or in the NIT (network information table) defined in the MPEG-2 Systems.

Now, examples of such description will be discussed below.

Firstly, an example of description in the TMCC signal will be described.

The ISDB-Tn Standard applicable to terrestrial digital audio transmission in Japan assigns the 188 MHz through 194 MHz band and the 192 MHz through 198 MHz band (with a bandwidth of 6 MHz) to radio broadcasting. Additionally, according to the ISDB-Tn Standard, up to 13 segments (each segment corresponding to an information channel) can be multiplexed for connected transmission within the bandwidth of 6 MHz.

For connected transmission, each of the channel encoders 2 generates an OFDM signal of the frequency domain assigned to the corresponding information channel for transmission and the generated OFDM signals are subjected to frequency conversion and multiplexing so that they may be transmitted collectively.

When generating the frame configuration for an OFDM signal, the corresponding on of the channel encoders 2 contains the number of connected segments ($B_{110}$ through $B_{113}$) and the segment number of the signal to be transmitted ($B_{114}$ through $B_{117}$) in $B_{110}$ through $B_{117}$ in the TMCC information (102 bits).

The number of connected segments is the total number of segments connected for transmission with the signal to be transmitted (that contains the TMCC signal). The number of connected segments is three when three information channels are connected for transmission and thirteen when thirteen information channels are connected for transmission. FIG. 18 shows an example of description on the number of connected segments. If two segments are connected, "0010" is described in the bits of ($B_{110}$ through $B_{113}$) and, if three segments are connected, "0011" is described in the bits of ($B_{110}$ through $B_{113}$). Similarly, if four segments are connected, "0100" is described in the bits of ($B_{110}$ through $B_{113}$) and the described value is incremented as another segment is added so that, if twelve segments are connected, "1100" is described in the bits of ($B_{110}$ through $B_{113}$) and, if thirteen segments are connected, "1101" is described in the bits of ($B_{110}$ through $B_{113}$). If no segment is connected for transmission (and hence the segment is used independently for transmission), "1111" is described in the bits of ($B_{110}$ through $B_{113}$). The numerical values that are not assigned refers to a reserved domain. Note that the so-called 3 segments format defining the hierarchical structure is not included in connected transmission and described as independent transmission.

The segment number shows the information on the relative position of the signal to be transmitted (that contains the TMCC signal) in the connected transmission.

Figure 19:
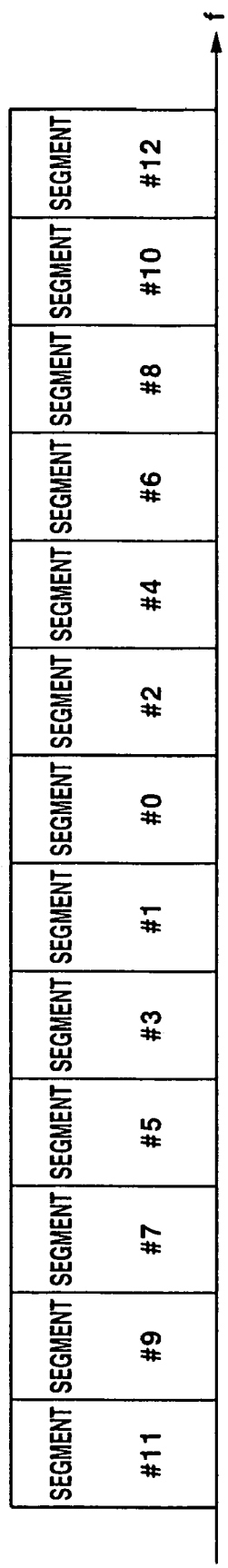
FIG. 19 is a schematic illustration of connected transmission of 13 segments.
Figure 20:
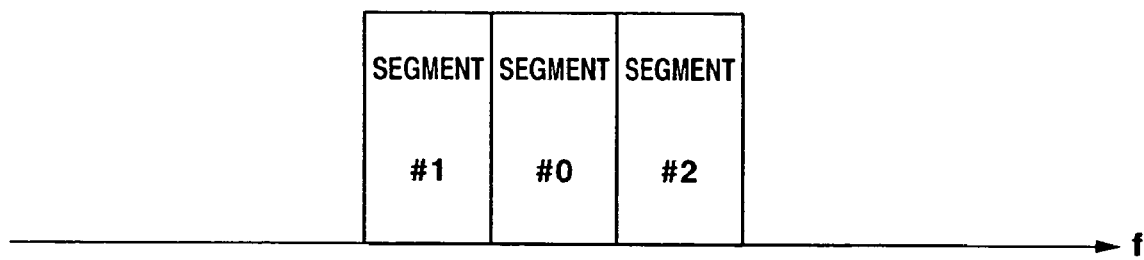
FIG. 20 is a schematic illustration of connected transmission of 3 segments.
Figure 21:
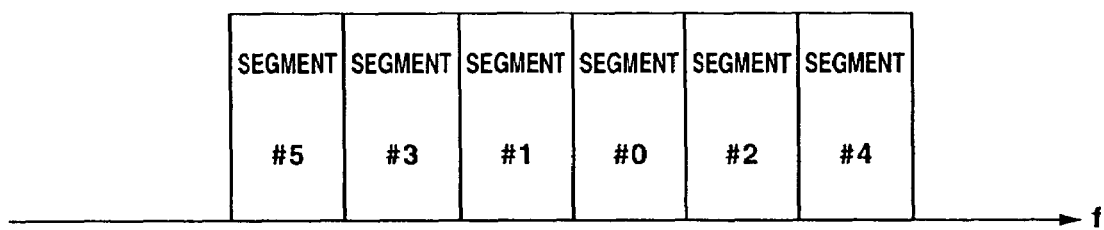
FIG. 21 is a schematic illustration of connected transmission of 6 segments.

According to the ISDB-Tn Standard, segment #0 is assigned to the center segment being used for connected transmission and the segment number is incremented alternately to the left and to the right from the center segment as shown in FIG. 19. Thus, when thirteen segments are connected for transmission, segment #0 through #12 are assigned to the respective segments in a manner as shown in FIG. 19. Similarly, when three segments are connected for transmission, segment #0 through #2 are assigned to the respective segments in a manner as shown in FIG. 20 and, when six segments are connected for transmission, segment #0 through 5 are assigned to the respective segments in a manner as shown in FIG. 21.

FIG. 22 schematically illustrates an example of description on the segment numbers in the TMCC signal.

Referring to FIG. 22, "1111" is described when the signal to be transmitted (that contains the TMCC signal) is located at the segment position with segment #0 and "1110" is described when the signal to be transmitted is located at the segment position with segment #1, while "1101" is described when the signal to be transmitted is located at the segment position with segment #2. In this way, the described value is decremented by one as the segment position is shifted by one so that "0011" is described when the signal to be transmitted is located at the segment position with segment #12. The domains where no segment number is assigned are reserved domains.

Then, upon obtaining the TMCC information, the receiver 21 determines if the information selected before the switch is connected to the information channel after the switch for transmission.

When an instruction for switching the information channel is given by the user, the RF frequency of the newly selected information channel is input by the user (or the information on the newly selected program or broadcast station is input by the user and the information on the selection is interpreted to obtain the RF frequency of the selected information channel typically by referring to a table). Subsequently, the difference between the RF frequency of the current information channel and that of the newly selected information channel is calculated. Then, the frequency difference is divided by the bandwidth of an information channel (and hence of a segment: 430 kHz) to reduce the frequency difference into the difference in the corresponding number of segments.

Figure 23:
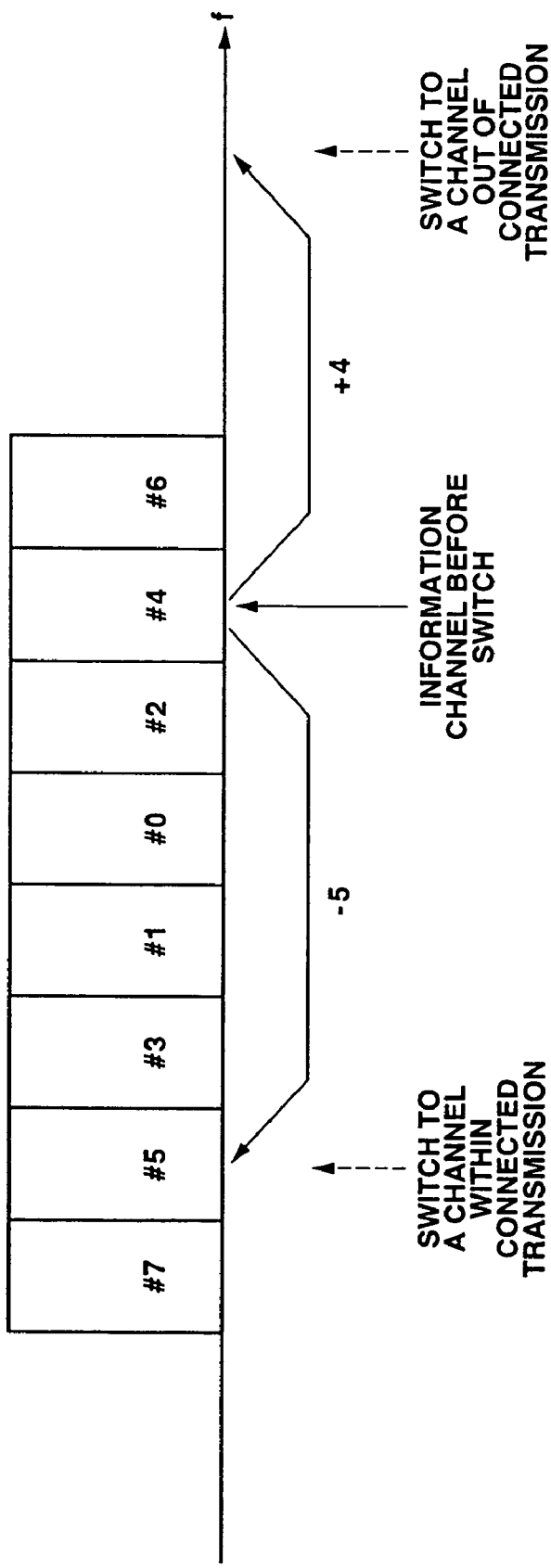
FIG. 23 is a schematic illustration of a shift to a channel inside a connected transmission scheme and to a channel outside the scheme.

Thereafter, it is determined if the newly selected information channel is located inside or outside the information channels connected for transmission on the basis of the obtained number of segments, the number of connected segments as described in the TMCC information and the segment number. For instance, as shown in FIG. 23, if the TMCC signal of the transmitted signal before the switch of the information channel shows that there are eight connected segments and the segment number is #4. Then, if the difference of segments separating the current information channel and the newly selected information channel is −5 as determined by the reducing operation, the segment number of the newly selected information channel is #5 and hence the newly selected information channel is found in the information channels connected for transmission. Contrary, if the difference of segments separating the current information channel and the newly selected information channel is +4 as determined by the reducing operation, no segment number is assigned to the newly selected information channel and hence the newly selected information channel is found outside the information channels connected for transmission.

Therefore, by describing the number of connected segments and their respective segment numbers in the TMCC information, it is possible to easily determine if the newly selected information channel is found within the connected information channels or outside thereof.

Now, an example of description of an NIT as defined in MPEG-2 Systems will be described below.

As pointed out earlier, according to the ISDB-Tn Standard, it is possible to multiplex up to thirteen segments (each segment corresponding to an information channel) for connected transmission within a bandwidth of 6 MHz. When describing the information on connected transmission in the NIT, the information channels within the bandwidth of 6 MHz are divided into groups on the basis of the unit of the information channels connected for transmission. Then, a unique group ID is assigned to each of the groups and described in the NIT.

For instance, assume that group ID0# is assigned to the group for connected transmission with the lowest frequency band within the bandwidth of 6 MHz, group ID1# is assigned to the next group for connected transmission and, in this way, group IDs are assigned to a total of seven groups for connected transmission so that group ID6# is assigned to the seventh group for connected transmission. Then, the information on connected transmission is described in the NIT by expressing each of the group numbers in three bits as shown in FIG. 24. Some other unique value (e.g., "111") will be assigned for an information channel to be used for independent transmission (without being connected for transmission).

Figure 25:
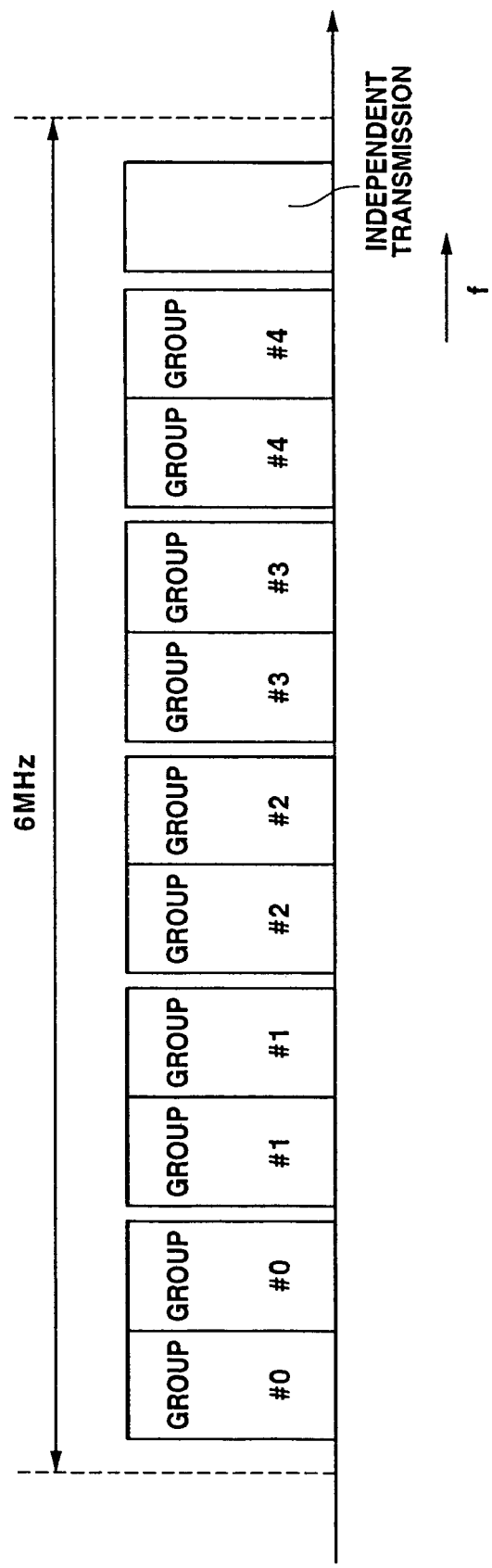
FIG. 25 is a schematic illustration of a transmission of five groups, each containing two segments, for connected transmission and that of a single segment for isolated transmission.

Assume that five connected transmission groups are found in a bandwidth of 6 MHz, each group containing two segments that are connected from transmission, along with a single segment for independent transmission. Then, group IDs as shown in FIG. 25 may be assigned to the connected transmission groups.

In such an NIT, a same and identical description will be made by the source encoder 1a for all the information channels. Then, at the receiver side, the NIT is analysed by the MPEG decoder 21 as shown in FIG. 15 and the obtained information is fed back to the receiver side. In other words, given an information channel, the receiver 21 can always determine the connected transmission group to which the information channel belongs by analysing the NIT.

Thus, upon receiving the information on connected transmission as described in the NIT, the receiver 21 determines if the newly selected information channel is connected to the previously selected information channel for transmission or not in a manner as described below.

Firstly, upon receiving an instruction for switching the information channel, it is determined if the newly selected information channel is found within the frequency channel that can be used for connected transmission (or the bandwidth of 6 MHz as described above. In the case of ISDB-Tn, no connected transmission is realized with any information channel outside the bandwidth). If the newly selected information channel is found outside the bandwidth of 6 MHz, it is determined that the information channel is not connected for transmission. If, on the other hand, the newly selected information channel is found within the bandwidth of 6 MHz, the NIT is referred to in order to compare the connected transmission group ID of the previously selected information channel and that of the newly selected information channel. If the two group IDs are found to agree with each other as a result of the comparison, the newly selected information channel is determined to be also connected for transmission. If, on the other hand, the two group IDs do not agree with each other, it is determined that the newly selected information channel is out of connected transmission.

In this way, it can be determined with ease if the newly selected information channel is also connected for transmission or out of connected transmission by describing the connected transmission group IDs in the NIT.

The information on connected transmission may be contained either in the TMCC information or in the NIT. Alternatively it may be contained in both the TMCC information and the NIT.

After determining that the newly selected information channel is also connected for transmission or out of connected transmission, the frame synchronism is maintained if the arrangement of OFDM frames is synchronized at the time of transmission. However, only the synchronism of the FFT windows may be maintained if the arrangement of OFDM frames is not synchronized.

What is claimed is:

1. An OFDM receiving device for receiving orthogonally frequency divided and multiplexed signals comprising:
   an OFDM receiving device comprising a receiver for selecting an information channel to be received and receiving an RF signal of the selected information channel;
   an orthogonal demodulator for orthogonally demodulating the signal received by said receiver and outputting the OFDM signal of a base band;
   a Fourier transform section for performing an operation of Fourier transform on said OFDM signal of the base band and outputting an OFDM signal of a frequency domain;
   a decoder for decoding said OFDM signal of the frequency domain;
   a selecting section for selecting the information channel;
   a control section for controlling said Fourier transform section and said decoder; and
   said OFDM signal of the base band containing information on connected transmission indicating whether the OFDM signal to be transmitted to an information channel and the OFDM signal to be transmitted to other information channels are transmitted in a connected state by multiplexing the OFDM signals of the frequency domain of a plurality of the information channel in a direction of the frequency and performing an inverse Fourier transform on the multiplexed OFDM signals collectively,
   said control section being adapted to determine whether the information channel being used for signal reception is coupled to the information channel to be selected at the selecting section for signal reception by switching by referring to information on connected transmission.

* * * * *